Dec. 26, 1933.  F. P. GARDNER  1,941,206
FIBER SCUTCHING AND DESEEDING MACHINE
Filed Sept. 20, 1930  8 Sheets-Sheet 1

Fig. 1.

INVENTOR
Frederick P Gardner
BY
Darby & Darby
ATTORNEYS

Dec. 26, 1933.  F. P. GARDNER  1,941,206
FIBER SCUTCHING AND DESEEDING MACHINE
Filed Sept. 20, 1930   8 Sheets-Sheet 2

Fig. 1a.

INVENTOR
Frederick P. Gardner
BY
Darby & Darby
ATTORNEYS

Dec. 26, 1933.  F. P. GARDNER  1,941,206
FIBER SCUTCHING AND DESEEDING MACHINE
Filed Sept. 20, 1930  8 Sheets-Sheet 4

Fig. 4.

INVENTOR
Frederick P Gardner
BY Darby & Darby
ATTORNEYS

Dec. 26, 1933.  F. P. GARDNER  1,941,206
FIBER SCUTCHING AND DESEEDING MACHINE
Filed Sept. 20, 1930  8 Sheets-Sheet 5

Fig. 5

INVENTOR
Frederick P Gardner
BY
Darby & Darby
ATTORNEYS

Fig. 5a.

Dec. 26, 1933.  F. P. GARDNER  1,941,206
FIBER SCUTCHING AND DESEEDING MACHINE
Filed Sept. 20, 1930   8 Sheets-Sheet 7

INVENTOR.
Frederick P Gardner
BY Darby & Darby
ATTORNEYS.

Patented Dec. 26, 1933

1,941,206

UNITED STATES PATENT OFFICE 1,941,206

FIBER SCUTCHING AND DESEEDING MACHINE

Frederick P. Gardner, New York, N. Y., assignor to Fabricord, Inc., New York, N. Y., a corporation of New York Application September 20, 1930
Serial No. 483,212

15 Claims. (Cl. 19—6)

This invention relates to an improved fiber cleaning and scutching machine and has for its object the provision of a simple and efficient machine that will handle fiber bearing stalks or straws, such as flax, hemp, jute or ramie, to quickly and efficiently remove the woody and other matter to any desired degree from the fiber bearing stalks or straws.

Another object includes the production of a machine that will deliver the resultant fiber in the form of line fiber freed from the woody or non-fibrous material to any desired degree, or as tow and upholstery tow with any desired percentage of non-fibrous material still adhering.

A further object of the invention is the production of a machine that will clean any bast fiber regardless of the length, thickness, or moisture content of the stalks or straws.

A further purpose of my invention includes the production of a machine for cleaning and scutching bast fiber alternately on opposite sides thereof.

Another object includes the provision of adjusting means for placing the machine units under absolute control, either as a whole or separately, whereby the machine has great flexibility and is capable of cleaning or scutching to any desired degree a great variety of fibers under widely varying conditions.

The machine moreover deseeds or removes the seeds from the straw without crushing or bruising said seeds and in a continuous operation cleans, scutches and polishes the fiber as may be desired. I further provide beater rolls so constructed as will submit the fiber bearing plant stalks or straws to a maximum disruptive or cleaning action with a minimum windage reaction. I also provide adjustable traveling breaker bars for feeding the fiber bearing stalks or straws to the beater roll and cushioning the same when subjected to the beater or cleaning action.

For some purposes, as for scutching and softening the fiber, it is desirable to use a beater bar having relatively fixed blades which may be preferably placed in staggered relation. In either form, however, I provide adjusting means for slidably moving the breaker bar and its frame so as to vary the distance between the breaker roll and its breaker bar. The breaker bar of either type is also swingably adjustable, that is the breaker bar is adjustable from a point so as to vary the arc in which the fibrous material is subjected to the beater action. Moreover, by varying the elevation or horizontal position of the breaker bars so that the fiber material is fed to the beater roll on its center line, or above or below its center line, the angle of attack of the beater blades is thereby varied. That is when the fibrous material is fed to the beater roll on a horizontal plane which coincides with the center line of the roll the beater blades will strike the fiber bearing stalks or straws at right angles. If now the plane on which the fibrous material is fed to the beater roll be raised or lowered so as to be above or below said center line plane then will the angle of attack be respectively greater or less than 90° and the disruptive action of the beater blade will vary as the angle of attack varies. That is, there is a greater breaking action of the woody matter above the center line plane of feed and a greater or more combing action below said plane of center line feed.

The traveling breaker bar moves slowly and feeds the fibrous material to the breaker roll. It also serves as a cushioning bed over which the fibrous material passes as it is whipped by the beater blades.

Another important function of the traveling beater bar is its ability to discharge the chives and fibers so that it is, in effect, self-cleaning. This is a great advantage inasmuch as the machine is continuous in operation and will not clog by reason of fiber and chives chocking the mechanism. The apparatus has great flexibility and is capable of handling a great variety of straws or fiber bearing plants under various conditions.

Other objects will appear hereinafter and I obtain these objects by the attached drawings, in which.

Like reference characters refer to similar parts throughout the several views wherever they appear.

Figure 1:
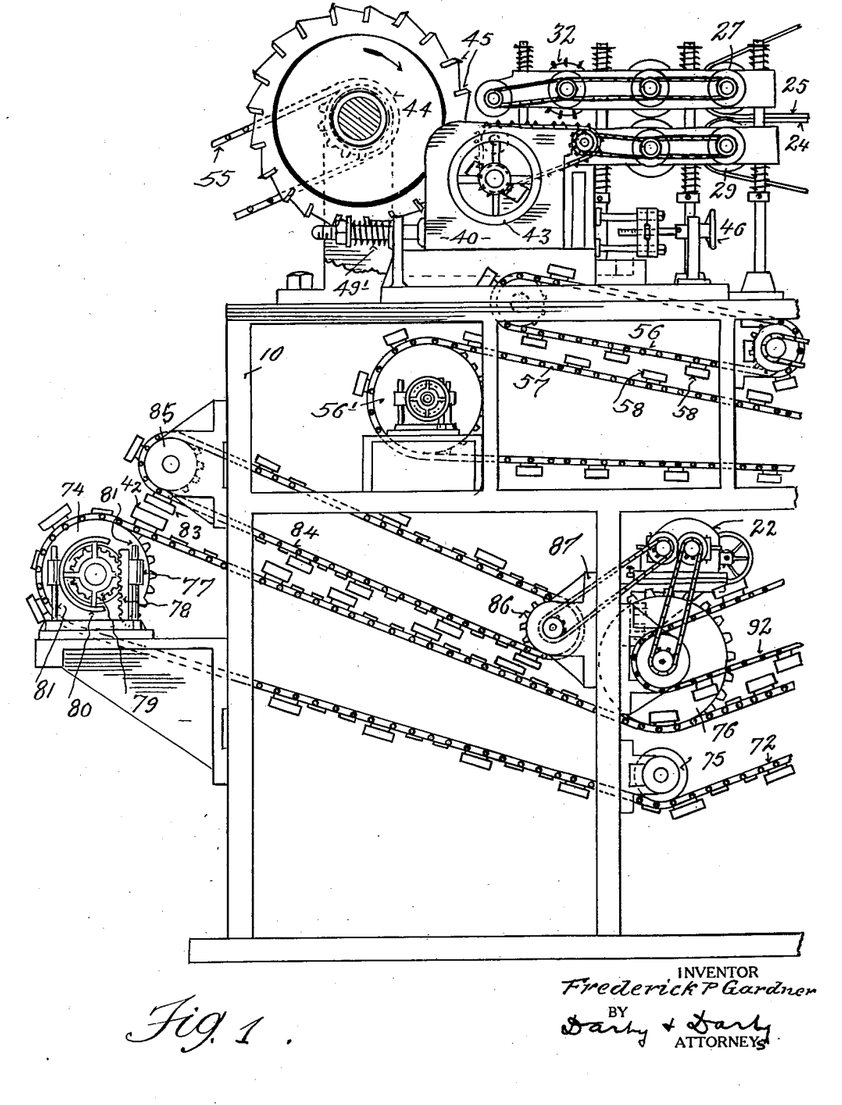
Figures 1 and 1A represent a side elevation of my improved fiber cleaning and deseeding machine.
Figure 1A:
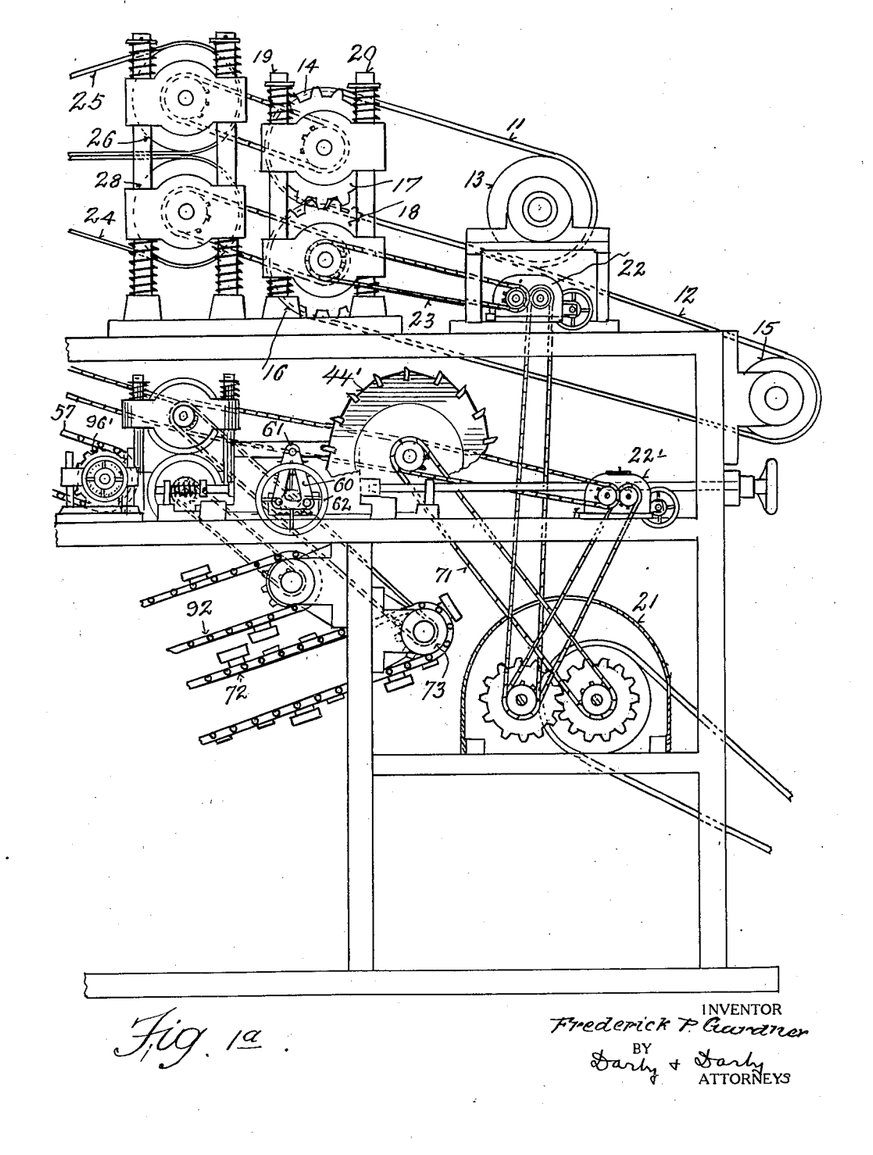

Referring now to the drawings with respect to the complete construction as illustrated in Figs. 1 and 1A I provide a frame 10 of suitable construction for supporting the various parts which enter into the machine. The essential features include the initial feed mechanism comprising belts 11 and 12 of suitable material, such as canvas, and supported on rolls 13, 14, 15 and 16. Rolls 14 and 16 are driven by intermeshing gears 17 and 18 and are flexibly supported on spring pressed stanchions 19 and 20. The rolls and belts are driven from any source of power, such as indicated diagrammatically at 21, through a conventional adjusting device 22 and chain 23. Roll 14 is preferably of fibrous composition so as to cushion the belt thereon and roll 16 may be of soft material, such as rubber or the like, to obtain a cushioning effect. The canvas belts 11 and 12, together with the cushioning rolls, serve also as deseeding means for the reason that said parts disrupt the seed bolls of such fiber and deseed in part or whole the straw, the seed being collected by any suitable means not shown. From the initial deseeding and feeding mechanism the fiber bearing plant stalks or straws are fed to a second set of belts 24 and 25 which are similarly supported on flexible rolls 26 and 27 of fibrous material and on cushioning rolls 28 and 29 of cushioning material, such as rubber. It is obvious that any seed pods or adhering seed retained by the straw will be further disrupted as the material passes through the belts.

From the second feeding and deseeding unit just described the material is fed forward to a pair of cushioning feed rolls 30 and 31 similarly constructed to those just described but without conveyor belts. A further disrupting and deseeding action is obtained here. The straw, however, is not broken or disrupted in any manner and is fed forward at a uniform rate. This rate may be controlled by the conventional adjusting device 22 and it is important to note that the speed at which the fibrous material is fed is of importance and is necessarily varied in accordance with the condition of the material as to its moisture content, or dryness, or other factors.

Figures 2, 3:
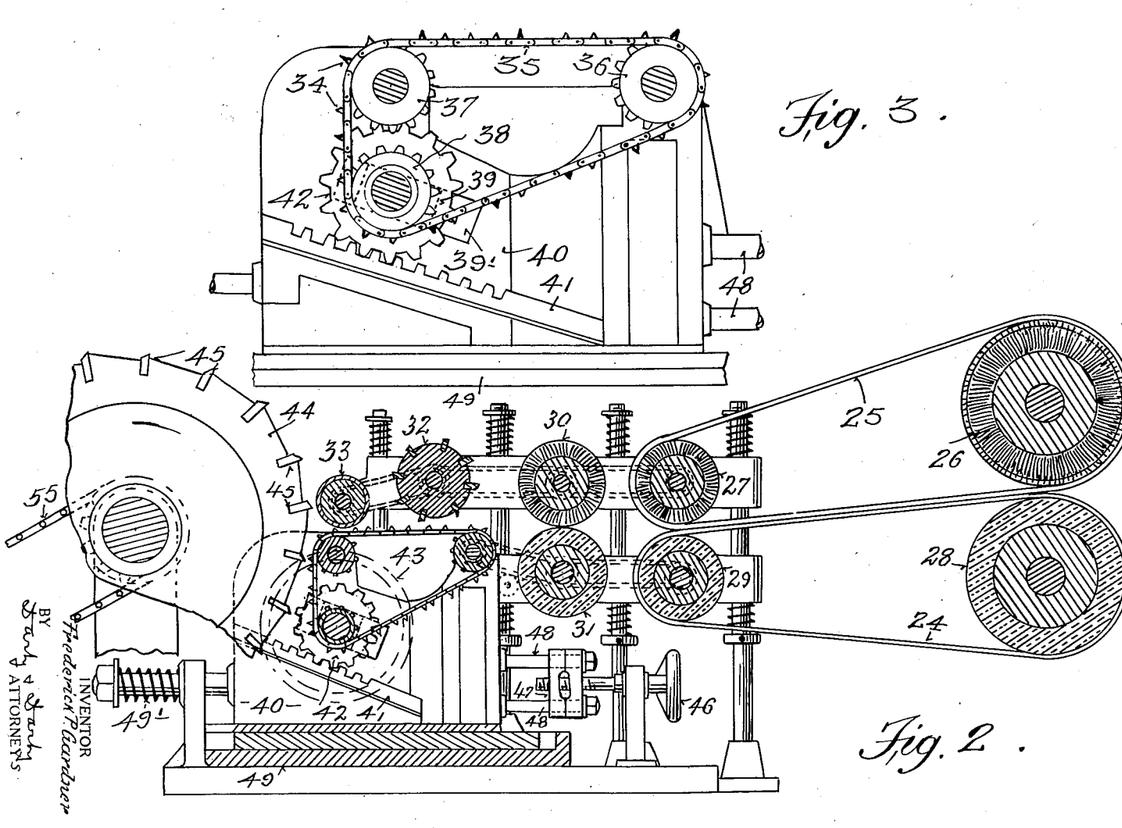
Fig. 2 is a side view of the first section of the machine with one side of the frame removed.
Fig. 3 is a side elevation of my new adjustable traveling breaker bar and frame.
Figure 4:
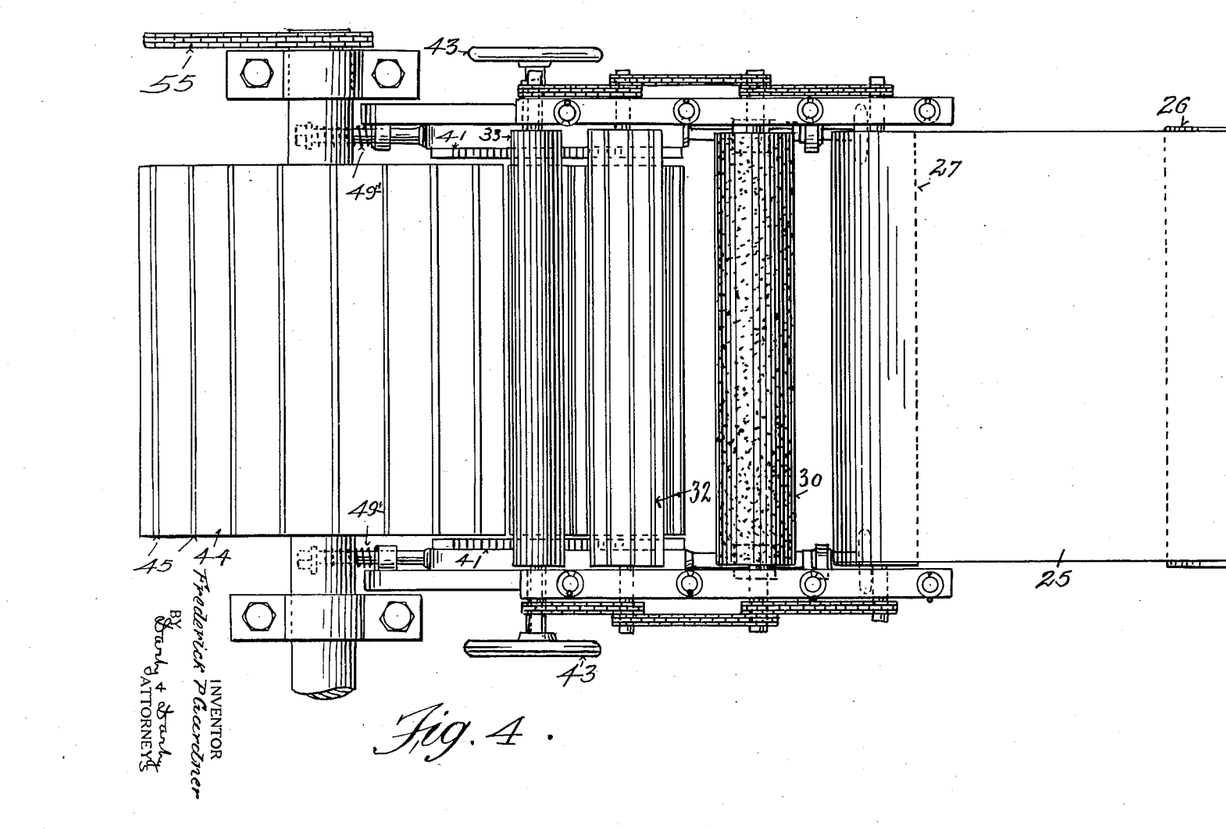
Fig. 4 is a top plan view of that part of the machine shown in Fig. 2.

After the material leaves rolls 30 and 31 the same passes onto the traveling breaker bar and is moved forward by said bar and the adjacent toothed roll 32 and smooth roll 33 which serve to hold the material in contact on the slats 34 of the traveling breaker bar shown in detail in Fig. 3 and elsewhere. The slats are carried by end chains 35. Said slats are of different height, as is clearly shown in Fig. 3, for the purpose of cushioning the fibrous material under different conditions so that when said material is fed and comes in contact with the beater blades, about to be described, the effect thereon will vary and a greater or lesser breaking and disruptive action is obtained by this irregularity of cushioning members.

The traveling beater bar is supported by two fixed end sprockets 36 and 37 and by two relatively movable end sprockets 38. The movable sprockets are each held on a block 39 in slots 39' of frame 40. A rack bar 41 in frame 40 engages the toothed pinion 42 and enables the operator to vary the vertical section of the movable breaker bar by means of a wheel 43 so as to subject the fibrous material to a longer or shorter arc of the beater roll 44. The distance between the carrying slats 34 of the traveling breaker bar and the effective edges of the beater ribs or blades 45 is further varied by horizontal adjustment of the traveling breaker bar frame 40. This adjustment is accomplished by a hand wheel 46 on either end engaging clevis 47 on the stanchions 48 connected to the frame 40 to thereby move the same in the frame bed 49. Spring 49' tensions the traveling beater bar frame towards the beater roll. The arrangement of the clevis 47 and stanchions 48 is such that the frame may adjust itself in the direction away from the beater roll under certain conditions, as when the fibrous material becomes bunched or is fed heavily. This arrangement makes the machine largely self adjusting and prevents choking.

Figure 7:
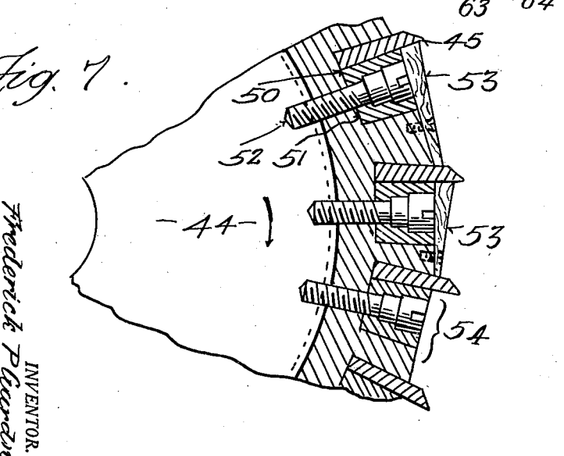
Fig. 7 is a section of a portion of the beater roll taken on the line 7—7 of Fig. 8.

The beater roll is of any desired length and may vary from a few inches to several feet. It is essentially a cylindrical member 44 provided with seats 50 in which are held the beater blades 45. These blades are held in their seats by lugs 51 secured in any desired manner, as by screws 52. The distance between the respective beater blades varies so as to accommodate different lengths of chives. The exposure of the beater blades also varies for a similar purpose and this variation may be effected by cover pieces 53 having sloping surfaces, as shown in Fig. 7. This arrangement is for the purpose of providing enough spaces for the scutching action of the beater blades and at the same time giving the least resistance to the atmosphere so as to overcome reaction produced when the beater roll is traveling at a high rate of speed.

Figure 8:
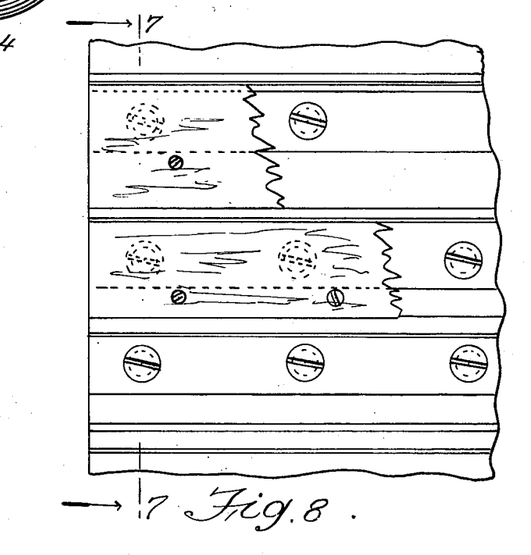
Fig. 8 is a plan view of said portion.

In Figs. 7 and 8 section 54 is shown without a cover piece. It is understood that in the finished construction cover pieces are provided for each section. The beater roll is operated by suitable means, as a driving belt or chain 55, which is under the control of the operator so as to vary the speed of the beater roll in accordance with the needs of the fibrous material to be treated.

After the fibrous material has been subjected to the beater action just described it is taken up by suitable means, as a set of conveyors 56 and 57. These conveyors are provided with slats 58 and carry the fiber bearing material to a second cleaning or scutching unit or beater roll 44'. For the purpose of varying the position of conveyor 57 an adjusting means, about to be described, is provided for the end sprockets 56'. The beater roll is so arranged that it will clean the fiber on the opposite side, and the fiber has been turned from its path so as to expose the opposite side to the beater action. Beater roll 44' is similar to beater roll 44. The material passes over a breaker bar which is preferably of the fixed blade type shown in Fig. 6. This type of breaker bar comprises blades 59 arranged in staggered relation and supported on a pivotally mounted frame 60 supported on pivots 61. It is understood that the blade members extend across the machine and are provided with the pivot supporting frame at both ends. In order to swingably adjust the fixed blade breaker bar a hand wheel 62 is provided. This hand wheel operates pinion 63 carried by the end of the swingable frame and operating in a rack bar 64. It is evident, therefore, that by adjusting the pinion by means of the hand wheel the blades will be brought closer in contact with the breaker blades of the breaker roll and thereby vary the arc and intensity of the scutching action.

Figure 6:
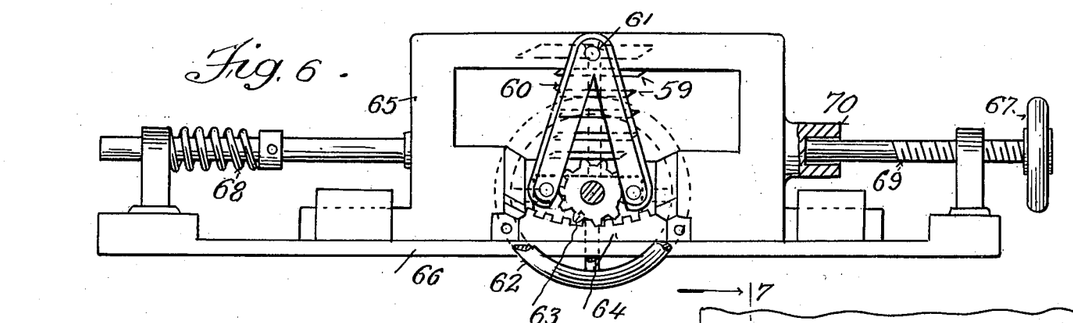
Fig. 6 is a side elevation of the fixed blade scutching bar showing the manner in which said bar is swingably and slidably mounted.

It will be noted that the breaker bar member just described is held in a frame 65 which is slidably supported on the base 66. A hand wheel 67 and spring 68 afford means for slidably adjusting said breaker bar frame. It will be noted that the stem 69 of the hand wheel is loosely held in socket 70 so as to permit the frame to be pushed against the action of spring 68 when abnormally heavy material is fed. This arrangement will prevent choking of the scutching roll. The scutching roll is operated from any source of power, such as 21, by means of a suitable belt or chain 71. The conveyor belts 56 and 57 are also operated from said source of power and are controlled by any suitable means, such as a conventional adjusting device 22'. This arrangement provides means whereby the fiber cleaning units, that is the beater rolls and the conveyor means are under control of the operator so as to meet various conditions of fiber.

After the fibrous material has been subjected to the second cleaning or scutching action it is free to the desired degree from woody and other foreign matter. The degree of non-fibrous material which is to be retained may be controlled by the position and angle of the breaker bar blades, as well as the rate at which the material is fed or the speed at which the beater roll is operated. It is evident that a higher speed will effect greater cleaning action, as will also the distances between the breaker and beater units.

Figures 9, 10, 11:
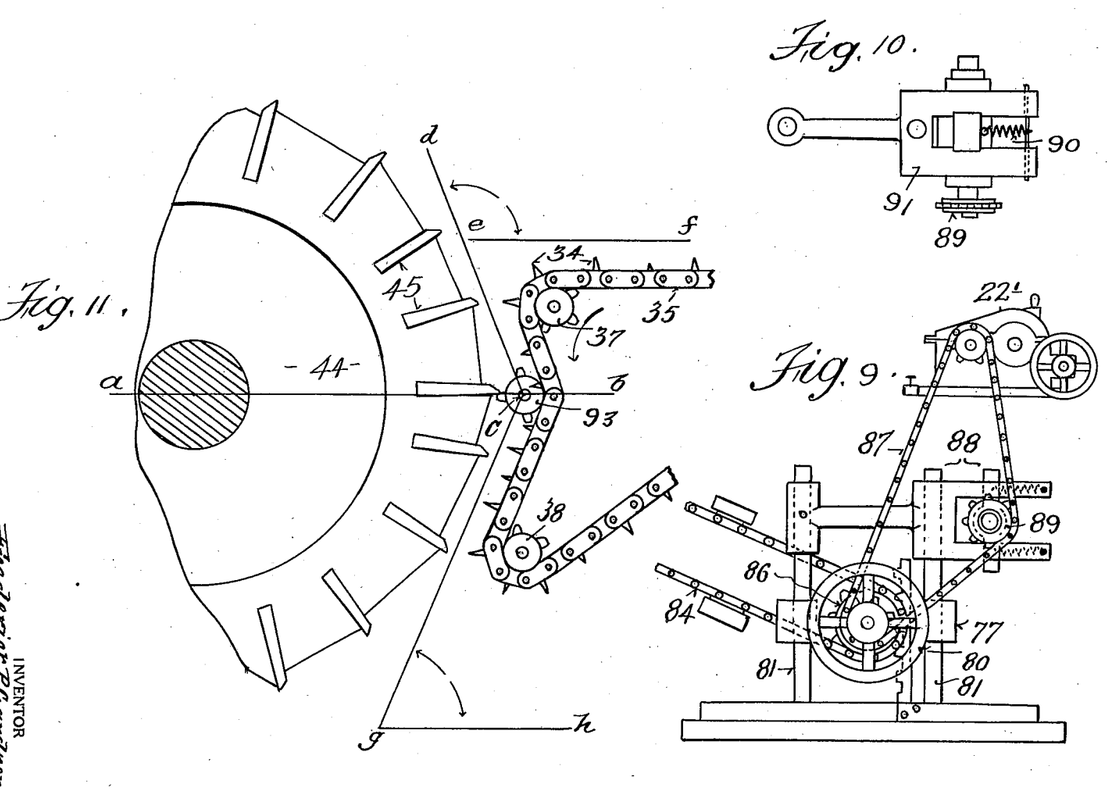
Fig. 9 shows one end of an adjustable conveyor and suitable tensioning means for adjusting the driving chain under different conditions.
Fig. 10 is a plan view of the take-up support and sprocket.
Fig. 11 is an end view of a portion of a breaker roll together with a modified form of its traveling breaker bar and showing said breaker bar arranged to feed the fibrous material to the breaker roll above its line of center of rotation. The figure also illustrates the variable angle of attack determined by the location of the feed planes.

In order to further clean or polish the fiber and to convey it away from the second scutching unit I have provided a set of conveyors. These conveyors may assume different constructions and for the present purpose I provide a fiber receiving conveyor 72 of suitable length. A desired form of construction comprises a downwardly sloping section and an upwardly sloping section so as to afford room for polishing and readjusting the fibrous material if desired. Conveyor 72 is supported on suitable means, such as end sprockets 73 and 74 and an intermediate roll 75 and sprocket 76. The end sprocket 74 is adjustably held on a frame 77 having a rack bar 78 with which engages pinion 79. Pinion 79 is controlled by a hand wheel 80 and by operating said hand wheel 80 and pinion 79 the sprocket frame slides up or down on studs 81. It will be observed that this arrangement raises or lowers the end of the conveyor so as to vary the distance between the carrier slats 82 and the polishing slats 83 of the adjacent conveyor 84. Said adjacent conveyor is supported in the usual manner by end sprockets 85 and 86. These sprockets, as shown in Fig. 1, are fixed. If desired, however, sprocket 86 may be provided with adjusting means similar to that just described for conveyor sprocket 74. One form of arrangement suitable for adjustably supporting the end sprocket is shown in Fig. 9. Inasmuch as the driving chain or belt 87 will have to vary in length with the position of the end sprocket 86 a tensioning device 88 is provided. This may take any suitable form, as a spring tension sprocket 89 tensioned by spring 90 and held in the supporting frame 91. If now the hand wheel 80 is turned so as to raise or lower the sprocket 86 in its frame 77, as before, the tensioning device will take up the slack of the chain in a manner well understood. It is obvious that this take-up of the slack may be employed wherever it is desired or where it is necessary because of the positions of the driving or driven members. In order to vary the relative speed of the conveyors the conventional adjusting device 22' is also provided for said conveyors so as to vary the relative speeds of the conveyor units.

In order to maintain the fiber in position on the receiving conveyor 72 I provide a holding conveyor 92. This conveyor operates usually at the same rate of speed as the immediate section of the receiving conveyor. In the case, however, of the polishing conveyor 84 said conveyor may be driven at a higher rate of speed than the adjacent section of the receiving conveyor so as to further clean and polish the fiber in the manner set forth above.

In the construction just described a fibrous material is fed to the beater rolls over either a traveling breaker bar or a stationary blade breaker bar. In both instances is the fibrous material fed towards the breaker roll on its center line, which may be represented by referring to Fig. 11 as line $a$—$b$. It will be noted that when fiber is fed in a horizontal plane coinciding with line $a$—$b$ the beater blades will attack the fiber approximately at right angles at the point $c$ and break or beat the same over the edge of the breaker bar at this point. If, however, the feed plane is raised above the line $a$—$b$ it is evident that the angle at which the breaker blades attack the fiber stalks will be greater than that when fed on the center line. In other words, if the feed plane is raised above the line $a$—$b$ the angle of attack will be greater at that point than at $a$—$b$, that is if we regard the angle of attack at $c$ in line $a$—$b$ to be 90°, as it is, then any point along line $c$—$d$ will be greater than 90° and as a matter of fact it will vary progressively on the arc of the circle. For the purpose of illustration angle $d\ e\ f$ may be regarded as the angle of attack for fiber fed on a given plane above the center line plane. This arrangement provides means for increasing the angle of attack and thereby increasing the scutching action. The angle of attack might be defined as that angle at the point where the breaker blades strike the fiber and the plane at which the fiber stalks are fed. It is also obvious that if the material is fed along a plane parallel with the plane fixed by $a$—$b$ but below said plane the angle of attack will be less than 90°. This angle might be illustrated by referring to Fig. 11 as angle $c\ g\ h$. Such arrangement will give the least severe cleaning action but will give a greater combing action and therefore is advantageous for that purpose. It might, therefore, be said that the effectiveness of the beater blades on the fiber varies with the angle of attack.

As a modification of the traveling breaker bar I have shown in Fig. 11 a portion of said traveling breaker bar where the cushioning slats 34 are carried on end chains 35, which chains pass over a sprocket 93 to give a greater space between the beater blades and the breaker blades. This arrangement is of advantage where the fibrous material is exceedingly tough for the reason that the fibrous material is exposed longer to the beater action. Obviously the modifying traveling beater bar sprocket 93 may be on the outside or inside of the chain so as to vary the beater action with respect to the cushioning breaker bar.

The apparatus just described provides means for cleaning and deseeding various fiber bearing plants or stalks named above. Where the fibrous material is to be deseeded the flexible belts 11, 12, 24 and 25 will effect the first disruptive action of the seed bolls. A further deseeding action is effected by rolls 30 and 31 and by the toothed beater roll 32, the traveling breaker bar, and the beater roll. The fibrous material is then subjected to cleaning alternately on both sides while the opposite side is being cushioned over suitable breaker members.

In this type of machine the material is fed towards the first beater roll in a horizontal plane. After passing the first beater unit the fiber is deflected from its path and subjected to the second beater action on the opposite side of the fiber, which action of course is possible to be repeated in case of necessity.

Figure 5:
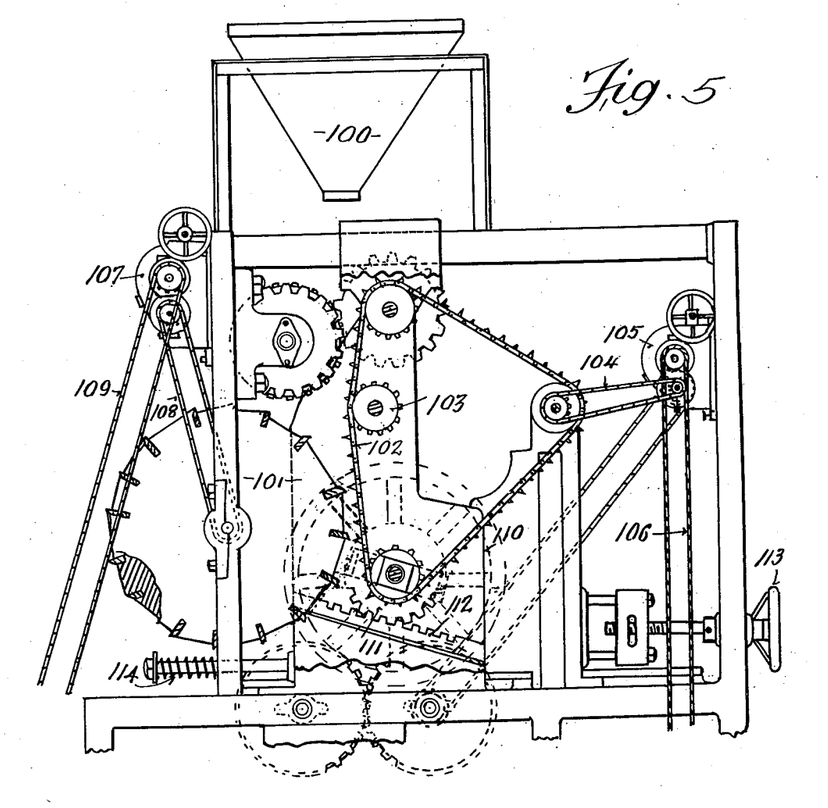
Figs. 5 and 5A show a side elevation of scutching units arranged one above the other, or side by side as the case may be depending upon the manner of mounting said units.
Figure 5A:
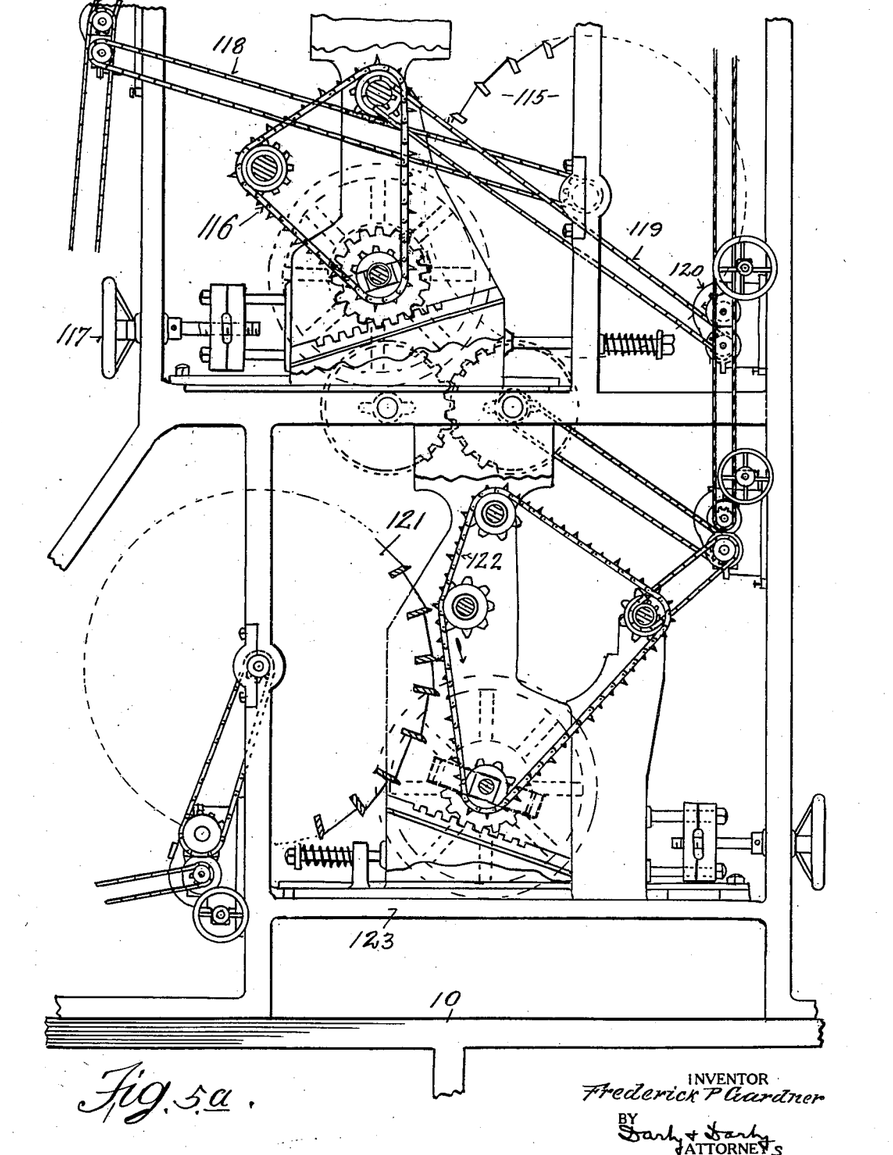

In Figs. 5 and 5A I have shown a machine which provides for a continuous travel in substantially the same plane while the beater action is applied two or more times on opposite sides. In general the construction of the beater rolls and breaker bars is substantially the same as that just described. The various units are capable of adjustment as to position and speed similar to those just defined. In the form illustrated as an example in Figs. 5 and 5A the machine may be placed on the frame 10 either vertically or horizontally. In the form shown it is in the vertical position. Fiber is fed into the hopper 100 to the beater roll 101 by means of the traveling breaker bar 102 which may be provided with an additional center sprocket 103. Said breaker unit is driven by means of chain 104 through a conventional adjusting device 105 and drive chain or belt 106. The beater roll is similarly driven through an adjusting device 107 and drive chains 108 and 109. This arrangement provides means for varying the speed of the beater roll and the breaker bar.

It is understood that the speed of the breaker bar is relatively slow and approximately that at which the material is fed while the breaker roll is always driven at a high rate of speed. This speed may vary and is frequently as much as one thousand revolutions per minute.

The lower section of the traveling breaker bar is adjustable by means of a hand wheel 110 operating an adjusting pinion 111 which registered with a rack bar 112. This arrangement is similar to the one described above for the swingable adjustment of the traveling breaker bar. A hand wheel 113 and spring 114 provide means for slidably adjusting the breaker bar frame similar to that of the first type of machine described above. After the fiber leaves the first breaker unit it passes to the second breaker unit where it receives a cleaning action from the opposite side by means of a second beater roll 15 which in form and construction is identical to the breaker roll 101. Opposite this breaker roll is a second traveling breaker bar 116. This breaker bar is also provided with an adjustment device 117 similar to that just described. Said beater roll is driven in unison by means of chain 118 through a conventional adjusting device so that the operator is able to adjust the speed of said breaker as the conditions may require. The traveling breaker bar is similarly operated through any suitable means, such as chain 119 and adjusting device 120.

It is to be understood that at this point the fiber may be cleaned and in condition to be taken from the machine. In that case an additional cleaning unit would not be necessary. For many purposes, however, I find it desirable that an additional cleaning unit be added and by this arrangement the fiber is cleaned by adjusting the beater roll to the same side as that of the first beater unit and the breaker unit is arranged opposite. Such a construction is shown at 121 which represents the beater roll and 122, representing the traveling breaker bar, similarly operated and arranged as that of Fig. 1. It is to be understood, however, that instead of the traveling breaker bar the fixed blade breaker bar may be substituted where desired. The frame 123 may be supported directly on frame 10.

Having now described my invention, what I claim as new and useful and desire to secure by United States Letters Patent is:

1. In a fiber cleaning and scutching machine, means for cleaning fiber on alternately opposite sides thereof, in combination with means for moving said fiber into fiber cleaning position, breaker bar members disposed in opposition to the cleaning and scutching means, and means whereby each of said breaker bar members is swingably and slidably adjustably held against the fiber cleaning means.

2. A machine for cleaning and scutching bast fiber, comprising a plurality of beater rolls and a plurality of breaker bars disposed alternately in pairs on opposite sides of fiber bearing stalks or straws which are fed between said beater rolls and said breaker bars to be cleaned and beaten on alternately opposite sides thereof, and means for adjusting said breaker bars so as to feed said fiber bearing stalks or straws to said beater rolls at varying angles to thereby vary the angle of attack of the beater roll.

3. A machine for cleaning and scutching bast fiber, comprising a plurality of beater rolls and a plurality of breaker bars disposed alternately in pairs on opposite sides of fiber bearing stalks or straws which are fed between said beater rolls and said breaker bars to be cleaned and beaten on alternately opposite sides thereof, means for adjusting the feeding angle of said breaker bars so as to feed the fiber bearing stalks or straws to said beater rolls, and means for varying the speed of either beater roll and breaker bar and the feeding means.

4. In a fiber cleaning and scutching machine, a beater roll having beater blades and a breaker bar over which the fiber is cleaned and/or scutched by said blades, said breaker bar comprising a plurality of blades arranged so that the breaking or scutching edges project unevenly and are held in fixed relation, a triangular frame for each end of the blades pivotally supported at the apex, a block carrying a pinion and frame block on which said blades are mounted at either end, a hand wheel to operate said pinion, and a rack bar for the pinion to thereby swing the breaker bar and vary the distance between the breaker bar blades and the beater blades.

5. In a fiber cleaning and scutching machine, a beater roll and a traveling breaker bar over which the fiber is cleaned and/or scutched by the beater roll, said breaker bar comprising end chains united by slats of different thickness and placed at varying distances to form a cushioning bed for the fiber cleaned thereon, a block or frame in which said traveling breaker bar is slidably held, means to slide said frame and bar to and from its scutching roll, and means to swing said breaker bar to vary the arc through which the beater roll attacks and cleans and scutches or softens the fiber.

6. In a fiber cleaning and scutching machine, a beater roll having beater blades, a traveling breaker bar having cushioning slats of varying size and spaced at varying distances, means for varying the relative speeds of said traveling bar and said beater roll, and means for varying the angle at which the beater blades strike the fiber bearing stalks or straws.

7. In a fiber cleaning and scutching machine, a beater roll having beater blades, a traveling breaker bar having cushioning slats of varying size and spaced at varying distances, means for varying the relative speeds of said traveling bar and said beater roll, and means for varying the length of the arc on which the fiber is scutched and combed.

8. In a fiber cleaning and scutching machine, a beater roll having beater blades, a traveling breaker bar having cushioning slats of varying size and spaced at varying distances, means for varying the relative speeds of said traveling bar and said beater roll, means for varying the distances between said traveling bar and said beater roll, means for varying the arc whereon the fiber is scutched and combed, and means for feeding the fiber material towards the beater roll at different angles.

9. In a fiber cleaning machine and scutching machine, a cylindrical beater roll having radially disposed beater blades, plates between said beater blades to expose said blades at varying depths, a breaker bar having cushioning members on which fiber material is supported and exposed to a cleaning and beating action by said beater blades, means for moving said breaker bar so as to vary the arc of contact of the beater blades with the fiber material to be cleaned or scutched, cushioning members for feeding said fiber material, and means for varying the relative speeds of the beater roll and fiber feeding means.

10. In a fiber cleaning machine and scutching machine, a cylindrical beater roll having radially disposed beater blades, plates between said beater blades to expose said blades at varying depths, a breaker bar having cushioning members on which fiber material is supported and exposed to a cleaning and beating action by said beater blades, means for moving said breaker bar so as to vary the arc of contact of the beater blades with the fiber material to be cleaned or scutched, cushioning members comprising a pair of rolls having flexing surfaces for feeding the fiber material to breaker bar and the beater roll, and cushioned belts between which the fiber material is fed to deseed the said material, and means for varying the relative speeds of the beater roll and the fiber feeding and deseeding means.

11. In a fiber cleaning and scutching machine, a beater roll having beater blades, a traveling breaker bar having cushioning slats of varying size and spaced at varying distances, means for varying the relative speeds of said traveling bar and said beater roll, means for varying the length of the arc on which the fiber is scutched and combed, means for feeding said fiber material onto the breaker bar uncrushed and unbroken, and means for deseeding said fiber material.

12. The method of varying the intensity of the cleaning and scutching action on fiber bearing straws and stalks which comprises varying the angle at which the straws or stalks are fed towards breaker blades, and varying the intensity with which said breaker blades strike the straws or stalks.

13. The method of varying the intensity of the cleaning and scutching action on fiber bearing straws or stalks which comprises imparting sharp blows to the fiber bearing straws or stalks and varying the angle of attack at which said straws or stalks are struck to be thereby cleaned or scutched.

14. In a fiber cleaning and scutching machine, a beater roll and a breaker bar, means for feeding fiber bearing stalks onto said breaker bar into contact with the beater roll, means for varying the relative distances between the beater roll and the breaker bar, and means for varying the angle of attack of the beater roll.

15. In a fiber cleaning and scutching machine, means for cleaning fiber on alternately opposite sides thereof, in combination with a device for feeding fiber to said fiber cleaning means at a preselected angle, means on said fiber feeding device for varying said angle, and means for controlling the speed of the fiber feeding device.

FREDERICK P. GARDNER.